United States Patent
Moynihan et al.

(10) Patent No.: US 9,088,486 B2
(45) Date of Patent: Jul. 21, 2015

(54) RETENTION OF A SUB-NETWORK CONNECTION HOME PATH

(75) Inventors: Jeffrey Scott Moynihan, Cumming, GA (US); Jack Oltman, Chamblee, GA (US); Vagish Madrahalli, Woodstock, GA (US); Neena Aluri, Johns Creek, GA (US)

(73) Assignee: Ciena Corporation, Hanover, MD (US)

( * ) Notice: Subject to any disclaimer, the term of this patent is extended or adjusted under 35 U.S.C. 154(b) by 310 days.

(21) Appl. No.: 13/424,063

(22) Filed: Mar. 19, 2012

(65) Prior Publication Data

US 2013/0242721 A1 Sep. 19, 2013

(51) Int. Cl.
*H04L 12/24* (2006.01)

(52) U.S. Cl.
CPC ................... *H04L 41/0672* (2013.01)

(58) Field of Classification Search
CPC ............... H04L 45/28; H04L 41/0659; H04L 2012/5627; H04L 41/0672; H04J 2203/006
USPC .................. 370/217, 221, 225, 227
See application file for complete search history.

(56) References Cited

U.S. PATENT DOCUMENTS

| | | | |
|---|---|---|---|
| 7,787,770 B2* | 8/2010 | Aubin et al. | 398/58 |
| 8,116,196 B2* | 2/2012 | Trudel et al. | 370/224 |
| 2003/0095554 A1* | 5/2003 | Shimizu | 370/395.53 |
| 2004/0233843 A1* | 11/2004 | Barker | 370/225 |
| 2010/0074101 A1* | 3/2010 | Skalecki et al. | 370/221 |
| 2010/0080119 A1* | 4/2010 | Ansorge | 370/225 |
| 2011/0047291 A1* | 2/2011 | Ishii et al. | 709/238 |
| 2012/0201132 A1* | 8/2012 | Hafid et al. | 370/230 |
| 2012/0281525 A1* | 11/2012 | Addanki et al. | 370/225 |

* cited by examiner

*Primary Examiner* — Paul H Masur
*Assistant Examiner* — Kabir Jahangir
(74) *Attorney, Agent, or Firm* — Clements Bernard PLLC; Christopher L. Bernard; Lawrence A. Baratta, Jr.

(57) ABSTRACT

Embodiments of the present invention provide a method and system for reserving a connection's home path resources and restoring the connection on a link that includes a reserved priority bandwidth. A bandwidth advertisement indicating that the reserved priority bandwidth is available is analyzed and a restoration request requesting to route the connection on the link is sent. The reserved priority bandwidth is used to route the connection when the connection has a reserved home path on the link. When the connection has a reserved home path not on the link, a determination is made as to whether a normal priority bandwidth on the link is available and whether the connection is unrestorable on another link. The reserved priority bandwidth is used to temporarily route the connection when normal priority bandwidth on the link is unavailable and the connection is unrestorable on another link.

20 Claims, 6 Drawing Sheets

RETENTION OF A SUB-NETWORK CONNECTION HOME PATH

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to relates to communication systems, and in particular, to a method and system for re-establishing connections in a communication network.

BACKGROUND OF THE INVENTION

It is critical in today's communication systems to provide and maintain the integrity of data communication networks even during line failures and module failures. A link failure may impact a large amount of data traffic and may cause many transmissions to be interrupted. Failures, which can be frequent and almost impossible to avoid, may be caused by human error or inclement weather. Accordingly, optimized protection signaling systems and methods are desired in order to quickly re-establish network communications once failures have been detected.

A line failure may result from damage to physical fibers and optical components, such as the malfunction of amplification equipment situated along the optical data path. Module failures may consist of errors in the transmission or reception equipment. Both line failures and module failures may disable the network segment or link between two adjacent nodes, forcing the connection off its original home path. It is therefore desirable in today's telecommunication network systems to provide rerouting and restoration techniques to reroute the interrupted traffic, and once the failure is repaired, restore the traffic to its original home path.

Link restoration methods may include handling a link failure by calculating a backup path and rerouting the traffic on the backup path, even though the calculated backup path may not be the most efficient path to reroute the traffic. While on the backup path, the connection may use bandwidth resources that are reserved for another connection, which may be undesirable given that the backup path may be the home path of another connection. Using the home path resources of the other connection may prevent the other connection from returning to its home path, which is undesirable, given that the home path may be an optimal and efficient calculated path for the other connection.

In a control plane enabled network, a subnetwork connection ("SNC") may move off a home/nominal path. The SNC may move off the path due to, for example, a mesh restoration or a maintenance action. When the SNC moves off the path, the path resources may be released and made available for other connections to utilize. Other times, the path resources may be strictly held and may not be available for other connections to utilize.

When path resources associated with an SNC are released, another connection may take the home/nominal path of the SNC when, for example, the SNC is first being provisioned or when the SNC is restored. This may prevent an SNC from returning to its home path after, for example, the link is repaired or the maintenance action is completed. On the other hand, when the path resources are strictly held, this may cause a reduction in an overall availability of restoration bandwidth, as the bandwidth is being held by the connection even when the connection is not on that path. Further, bandwidth that is being held is advertised as unavailable for utilization by new SNCs. The standard network bandwidth advertisement does not explicitly identify whether a link is up or down, and advertises how much bandwidth is available. For example, when a link is down, the advertisement may indicate '0' bandwidth available. The advertisement may not state details, such as whether the link is up but fully occupied or whether the link is down. This may make it difficult to know when an SNC that is on a restoration path may return to its home path. The advertisement may not help in determining when the connection can be reverted back to its home/working path.

It is desirable to have a method and system to retain a connection's home path resources and restore the connection to its home path once a link failure has been repaired.

SUMMARY OF THE INVENTION

The present invention advantageously provides a method and system for routing a connection. In accordance with one aspect, the invention provides a method for restoring a connection on a link, the link including a reserved priority bandwidth. A bandwidth advertisement indicating that the reserved priority bandwidth is available is analyzed. A restoration request requesting to route the connection on the link is sent. The reserved priority bandwidth is used to route the connection when the connection has a reserved home path on the link. When the connection has a reserved home path not on the link, a determination is made as to whether a normal priority bandwidth on the link is available and whether the connection is unrestorable on another link. The reserved priority bandwidth is used to temporarily route the connection when a normal priority bandwidth is unavailable and the connection is unrestorable on another link.

In accordance with another aspect, the invention provides an apparatus for restoring a connection on a link, where the link includes a reserved priority bandwidth. The apparatus includes a control circuit that analyzes a bandwidth advertisement indicating that the reserved priority bandwidth is available. The control circuit sends a restoration request requesting to route the connection on the link. The control circuit uses the reserved priority bandwidth to route the connection when the connection has a reserved home path on the link. When the connection has a reserved home path not on the link, the control circuits makes a determination as to whether a normal priority bandwidth on the link is available and whether the connection is unrestorable on another link. The control circuit uses the reserved priority bandwidth to temporarily route the connection when a normal priority bandwidth is unavailable and the connection is unrestorable on another link.

According to another aspect, the present invention provides a system that includes an originating network element and a terminating network element connected via a link. The originating network element analyzes a bandwidth advertisement indicating that a reserved priority bandwidth on the link is available. The originating network element sends a restoration request requesting to route a connection on the link. The terminating network element receives the restoration request. The terminating network element uses the reserved priority bandwidth to route the connection when the connection has a reserved home path on the link. When the connection has a reserved home path not on the link, the terminating network element makes a determination as to whether a normal priority bandwidth on the link is available and whether the connection is unrestorable on another link. The terminating element uses the reserved priority bandwidth to temporarily route the connection when a normal priority bandwidth is unavailable and the connection is unrestorable on another link.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
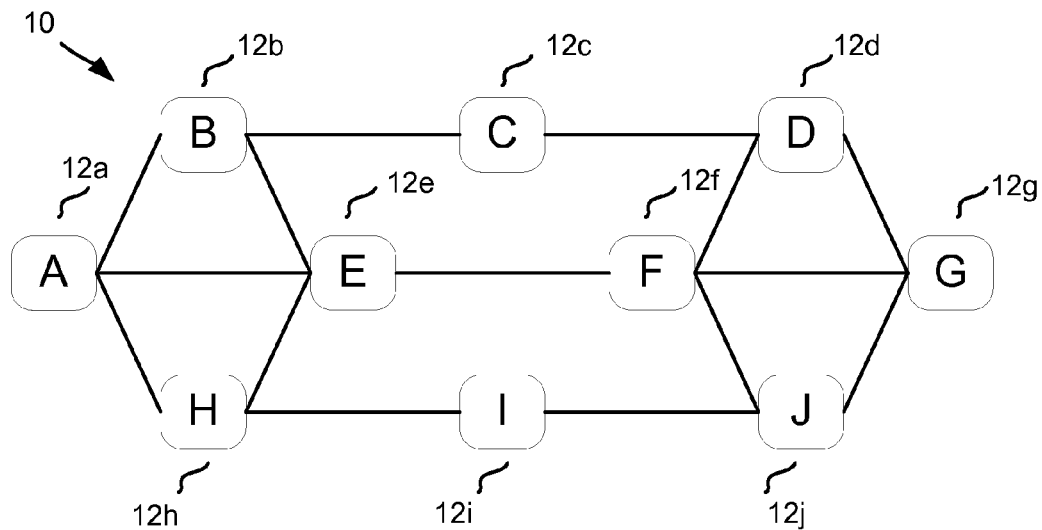
FIG. 1 is a block diagram of an exemplary network constructed in accordance with principles of the present invention.

Before describing in detail exemplary embodiments that are in accordance with the present invention, it is noted that the embodiments reside primarily in combinations of apparatus components and processing steps related to implementing a system and method for retaining a connection's home path and rerouting the connection. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

When a connection moves from its home path, it may be inefficient to reserve a resource for the connection, as the connection has already been restored on another path. Also, when the resource is reserved and is unavailable for other connections, dynamic repacking of the link's resources to a more efficient configuration may not be possible. For instance, in the event of multiple network failures, it may be more efficient to use reserved resources as, for example, a last resort to restore other traffic. Given that the connection associated with the reserved resources is not currently on its home path, the use of these resources may not have a significant impact on traffic. In like manner, the home path resources of the connection may be reserved so that the connection may eventually return to its home path.

The concept of retaining a home path may be used as applied to a time division multiplexing ("TDM") application, such as synchronous optical networking/synchronous digital hierarchy ("SONET/SDH") or optical transport network ("OTN"), maybe to not preempt resources of another active connection, but instead to both hold in reservation the resources of an existing home path, and while otherwise on a restoration path, to allow another connection to utilize the reserved resource as a last resort. For example, in the case where the connection is not using that resource and is on a restoration path of its own, availability of a resource to support reversion may be determined without advertising the reserved resource, thereby allowing other connections to utilize the reserved resource.

Retaining the home/working path may be advantageous, as the home path may have been calculated to meet objectives of constraint based routing that may not otherwise be explicitly known by a control plane, or to take advantage of limited resources. Reserving the home path for a given connection may prevent the operational complexity of re-establishing a path that meets desired constraints in the event a connection was not able to return to its home/working path.

One approach to restoring a connection involves using a Retain Home Path feature. The Retain Home Path feature reserves the resources of the home path while the SNC is not on all or part of the home path. By using the Retain Home Path feature, the home path resources may be reserved for the SNC. For example, when the SNC moves off its home path, other SNCs may use the resources of the vacated home path. The SNC may not be able to return to its home path when the resources of the home path are being used by other SNCs.

The Retain Home Path feature may introduce a second bandwidth advertisement level for a control plane link associated with a reserved home path bandwidth resources. In addition to advertising normal bandwidth on the control panel link, reserved bandwidth may be used to advertise availability for home paths to be set up on a link. This may include new SNC setup requests and returning SNC's with a home path on the link.

When a SNC has set up a home path on a link, but the SNC is not on the link, the bandwidth resources of the home path may be reserved for the SNC. The home path may represent a virtual SNC on the path and may reserve the home path bandwidth resources of the link for the SNC, so that the SNC may be restored to its original home path. The SNC with reserved bandwidth resources on a link may utilize the reserved bandwidth resources. Additionally, an SNC may preempt home path resources of another SNC during restoration if no other path is available.

Referring now to the drawing figures, in which like reference designators denote like elements, there is shown in FIG. 1 a schematic illustration of an exemplary network constructed in accordance with the principles of the present invention, and generally designated as "10." Network 10 includes multiple nodes, e.g., 12a, 12b, 12c, 12d, 12e, 12f, 12g, 12h, 12i and 12j, connected by links (nodes 12a through 12j are referred to collectively herein as "nodes 12"). Network 10 includes multiple paths between a source node, e.g., node 12a, and a destination node, e.g., node 12g. The lines represent alternate paths through the network. Although FIG. 1 shows exemplary network 10, the invention is not limited to such network. The invention may be used with a variety of network sizes and configurations.

Figure 2:
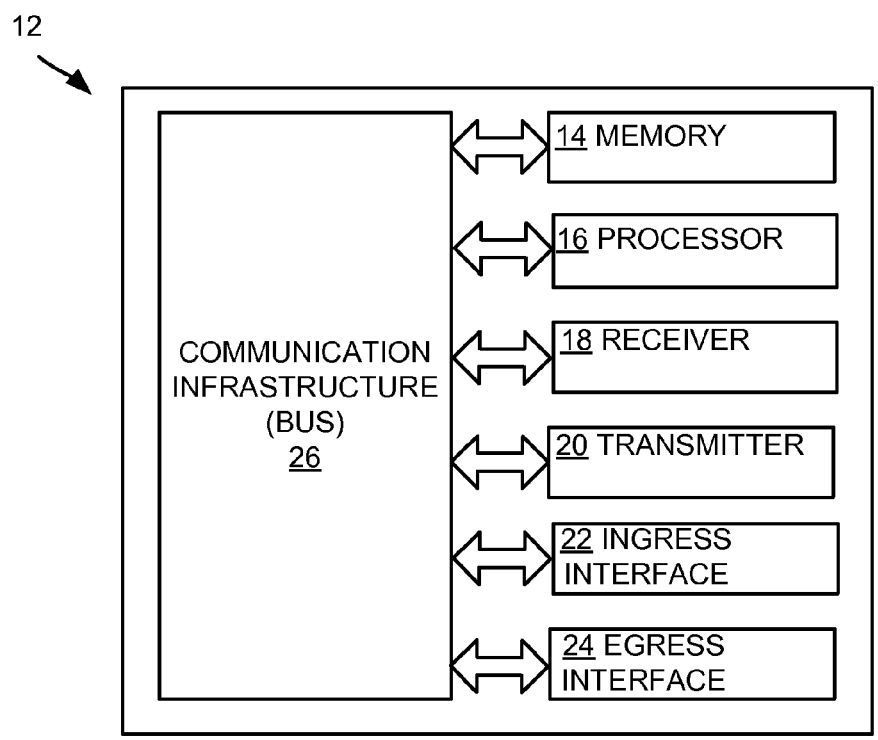
FIG. 2 is a block diagram of an exemplary apparatus constructed in accordance with the principles of the present invention.

FIG. 2 shows an exemplary network node 12 constructed in accordance with principles of the present invention. Network node 12 includes memory 14, processor 16, receiver 18, transmitter 20, ingress interface 22 and egress interface 24 connected by communication infrastructure 26. Memory 14 may contain topology information relating to a topology of at least a portion of network 10, and may include topology information relating to a path through network 10 from a source node, such as node 12a, to a destination node, such as node 12g. The topology information may also include home path information for each link, and connections associated with each node in the network.

Processor 16 operates under the direction of software instructions to perform the various functions described herein for determining and establishing a new path in network 10 when a link in an original path in network 10 fails. Processor 16 may determine and establish a home path for a SNC in network 10 and may perform revert and regroom operations with respect to SNCs in network 10. Processor 16 may perform operations for restoring a connection on a link along an alternate path between the source node and the destination node, when a link on an original path between these nodes has failed. A link may include a reserved priority bandwidth for a particular SNC. A bandwidth advertisement may be received by receiver 18. The processor 16 may determine availability of at least one of normal priority bandwidth and reserved priority bandwidth by analyzing the bandwidth advertisement. Processor 16 may determine that reserved priority bandwidth is available and transmitter 20 may send a restoration request to restore the connection.

Processor 16 may determine that the connection may have a reserved home path on the link, and may use the reserved priority bandwidth to route the connection. Alternatively, the processor may determine that the connection does not have a home path on the link. The processor may then determine a normal priority bandwidth on the link is unavailable and that the connection is unrestorable on another link. The processor may then temporarily route the connection using the reserved priority bandwidth.

Network node 12 may also includes an ingress interface 22 and an egress interface 24 to interface with an ingress link and an egress link, respectively. The ingress interface 22 may be connected to an ingress link and the egress interface 24 may be connected to an egress link. Processor 16 may exercise control over these interfaces to tear down and establish connections to ingress and egress links as needed.

Figure 3:
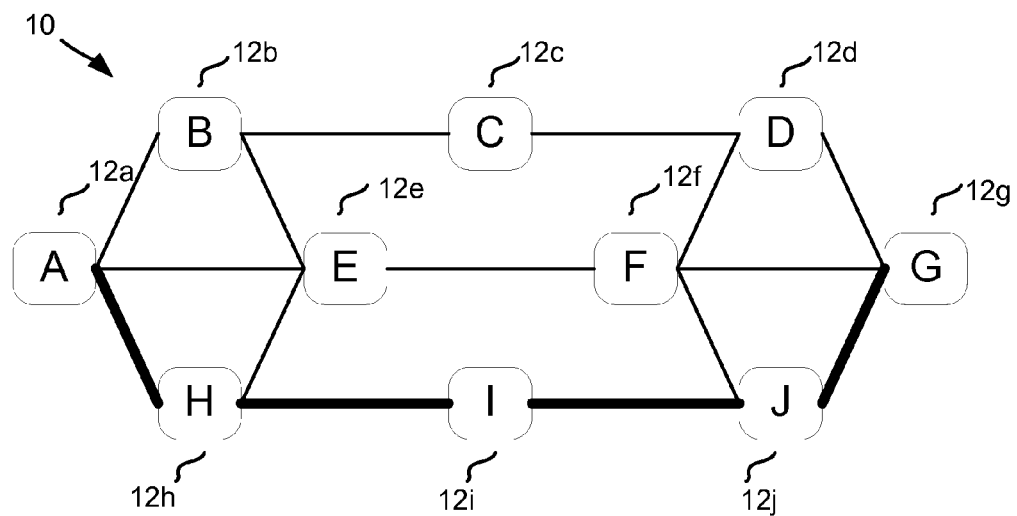
FIG. 3 is a block diagram of an exemplary network showing a current path of an SNC, constructed in accordance with principles of the present invention.

FIG. 3 is a diagram of the network of FIG. 1 showing the home path of an SNC, where the thick solid line in the drawing indicates an exemplary SNC's current path between originating network element, i.e. originating node 12a and terminating network element, i.e. node 12g via intermediate nodes 12h, 12i and 12j. In this exemplary embodiment, originating node 12a may send a home path setup request to all nodes along a proposed path to setup the home path of the SNC on the proposed path, where the proposed path starts at originating node 12a and ends at terminating node 12g via intermediate nodes 12h, 12i and 12j, i.e. the proposed home path is the current SNC path. Originating node 12a may determine the SNC's current home path route using a list containing explicit route representation, such as a designated transit list ("DTL"), or using a command to request the SNC to send to originating node 12a its current SNC Path. The DTL may include a list of nodes and optional link identifications that completely specify a path across a group of nodes.

Originating node 12a may determine that the SNC is already on the proposed home path. The setup request may include a Home Path Flag enabled. Originating node 12a may send a setup request along the current SNC path, i.e. the path between the originating node 12a and the terminating node 12g via intermediate nodes 12h, 12i and 12j. The terminating node 12g may return a connect message to all nodes along the SNC path. The connect message may set up the home path at all nodes along the SNC path. Since the SNC is already on the proposed home path, i.e. the current path is the same as the proposed home path, setting up the home path of the SNC on the current SNC path may not have a significant impact on the traffic.

Figure 4:
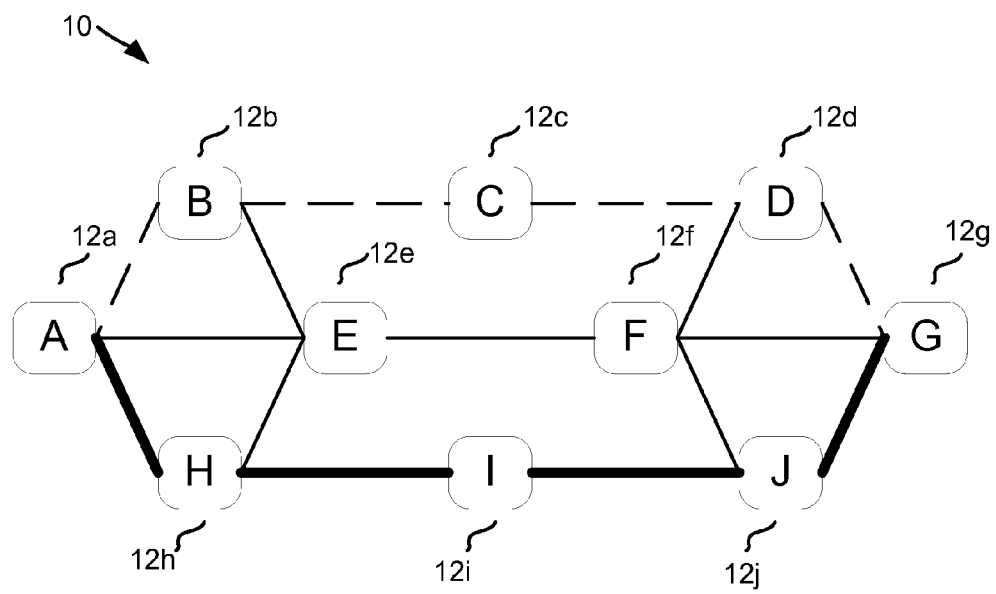
FIG. 4 is a block diagram of an exemplary network with a current path and a proposed path of an SNC, constructed in accordance with principles of the present invention.

FIG. 4 is a diagram of the network of FIG. 1, where the thick solid line indicates an SNC's current path between the originating node 12a and the terminating node 12g via intermediate nodes 12h, 12i and 12j. In this exemplary embodiment, originating node 12a may decide to setup a home path for the SNC on a proposed path, where the proposed path, shown as a dashed line, starts at originating node 12a and ends at terminating node 12g, via intermediate nodes 12b, 12c and 12d. Originating node 12a may determine the SNC home path route using a designated transit list ("DTL") or using a command to request the SNC to send its current SNC path to originating node 12a.

Originating node 12a may determine that the SNC is not on the proposed home path. Originating node 12a may send a setup request along the new SNC path that includes nodes 12a, 12b, 12c, 12d and 12g. The setup request may include an enabled Home Path Flag. The setup request will setup both the SNC and the home path using a regroom operation. The regroom operation may be a break before make ("BBM") regroom or a make before break ("MBB") regroom. If BBM regroom is used, the setup of both the SNC and the home path may have an impact on the traffic. If MBB regroom is used, the setup of both the SNC and the home path may have a minimal impact on the traffic.

Originating node 12a may apply a standard regroom operation to move the SNC to the proposed home path, as the SNC is not currently on the proposed home path. Originating node 12a may send a release request along the current SNC path, i.e. the path between the originating node 12a and the terminating node 12g via intermediate nodes 12h, 12i and 12j. The release request may release both the current SNC path and the home path if applicable. A connect message may be returned by terminating node 12g to set up the home path at all nodes along the new SNC path. The SNC is then setup to use as its home path the path between the originating node 12a and the terminating node 12g via intermediate nodes 12b, 12c and 12d.

Figure 5:
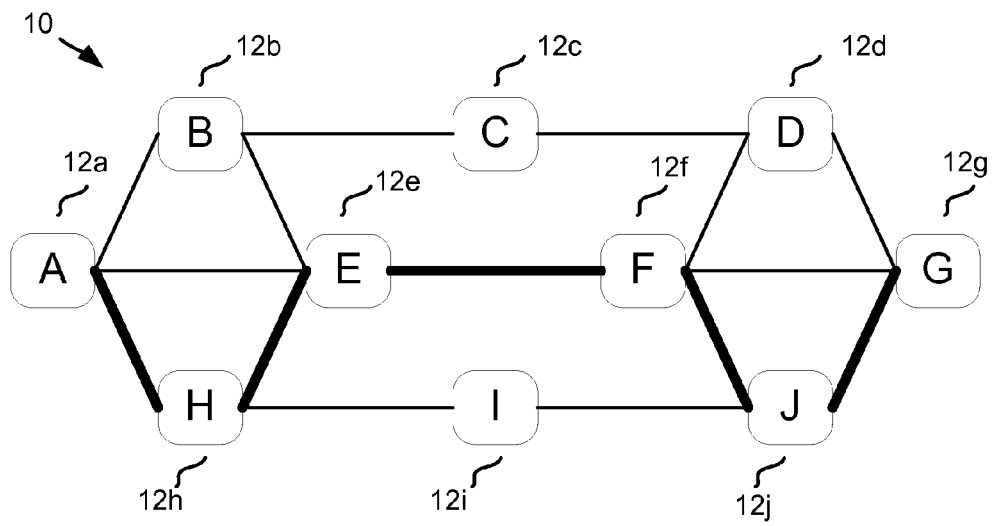
FIG. 5 is a block diagram of an exemplary network where a current path of an SNC is also the proposed path of the SNC, constructed in accordance with principles of the present invention.

FIG. 5 is a diagram of the network of FIG. 1, where the thick solid line is used to indicate an SNC's current path between the originating node 12a and the terminating node 12g via intermediate nodes 12h, 12e, 12f and 12j. In this exemplary embodiment, originating node 12a may decide to setup a home path for the SNC on a proposed path, where the proposed path starts at originating node 12a and ends at terminating node 12g via intermediate nodes 12h, 12e, 12f and 12j, i.e. the proposed home path is the current SNC path. In this exemplary embodiment, originating node 12 may use a retain home path feature to set up a home path for the SNC and reserve resources of the home path while the SNC is not on all or part of the home path. Originating node 12 may determine the SNC route using a designated transit list ("DTL") or may calculate the new SNC route using a known route calculation algorithm.

Originating node 12a may determine that the SNC is already on the proposed home path. Originating node 12a may verify all nodes along the new SNC route, i.e. network elements 12a, 12h, 12e, 12f, 12j and 12g, support the retain home path feature. Originating node 12a may send a setup request along the path that includes nodes 12a, 12h, 12e, 12f, 12j and 12g. The setup request may include an enabled Home Path Flag. The setup request may have the home path indicated on the proposed path. Originating node 12a may send a setup request along the current SNC path, i.e. the path between the originating node 12a and the terminating node 12g via intermediate nodes 12h, 12e, 12f and 12j. The setup request will establish and setup the home path. Terminating node 12g may return a connect message to all nodes along the home path. The message may setup the home path at nodes along the SNC path, i.e. nodes 12a, 12h, 12e, 12f, 12jd and 12g. Since the SNC is already on the proposed home path, i.e. the current path is the same as the proposed home path, setting up the home path of the SNC on the current SNC path may not have a significant impact on the traffic.

Figure 6:
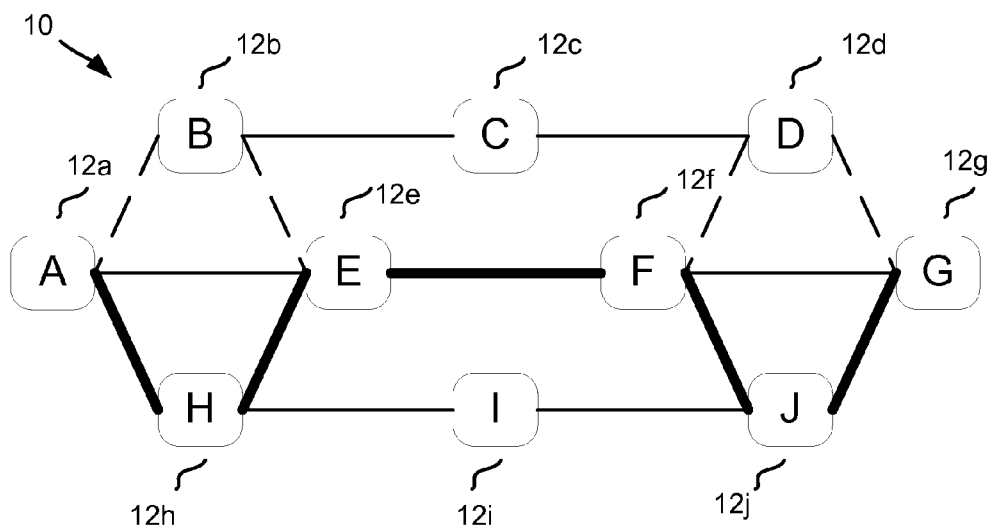
FIG. 6 is a block diagram of an exemplary network with a current path and a proposed path of an SNC, constructed in accordance with principles of the present invention.

FIG. 6 is a diagram of the network of FIG. 1, where the thick solid line is used to indicate an SNC's current path between the originating node 12a and the terminating node 12g via intermediate nodes 12h, 12e, 12f and 12j. Dashed lines in FIG. 6 represent the proposed home path. In this exemplary embodiment, originating node 12a may decide to setup a home path for the SNC on a proposed path, where the proposed path starts at originating node 12a and ends at terminating node 12g via intermediate nodes 12b, 12e, 12f and 12d. In this embodiment, originating node 12 may use a retain home path feature to set up a home path for the SNC and reserve resources of the home path while the SNC is not on all or part of the home path. Originating node 12 may determine the SNC route using a designated transit list ("DTL") or may calculate the new SNC route using a known routing algorithm.

Originating node 12a may determine that the SNC is not on the proposed home path. Originating node 12a may verify all nodes, i.e. network elements 12a, 12b, 12e, 12f, 12d and 12g along the new SNC route support the retain home path feature. Originating node 12a may send a release request along the current SNC path, i.e. the path between the originating node 12a and the terminating node 12g via intermediate nodes 12h, 12e, 12f and 12j. The release request may release the home path if applicable. While FIG. 6 shows a non MBB arrangement, an MBB arrangement may be employed.

Originating node 12a may send a setup request along the new SNC path that includes nodes 12a, 12b, 12e, 12f, 12d and 12g. The setup request may include a Home Path Flag enabled. The setup request may have the home path indicated on the proposed path. Originating node 12a may apply a standard regroom operation to move the SNC to the proposed home path. The setup request will setup both the SNC and the home path. Terminating node 12g may return a connect message that may setup the home path at nodes along the SNC path, i.e. nodes 12a, 12b, 12e, 12f, 12d and 12g. The regroom operation may be a break before make ("BBM") regroom or a make before break ("MBB") regroom. If BBM regroom is used, the setup of both the SNC and the home path may have an impact on the traffic. If MBB regroom is used, the setup of both the SNC and the home path may have a minimal impact on the traffic. The SNC has been setup to use as its home path the path between the originating node 12a and the terminating node 12g via intermediate nodes 12b, 12e, 12f and 12d.

In another exemplary embodiment, an SNC action may include regroom, switch to protect ("STP"), and revert. A regroom operation may move the home path to a new SNC path. A regroom operation may be utilized with MBB to limit the impact on traffic. STP action may be revertive or non-revertive, and may not move the home path. A STP minimal or maximum route diversity may affect a protect path DTL computation. STP may be used in conjunction with a bandwidth lockout operation to switch the SNC off all or parts of the SNC path. The control plane may move an SNC to a different line on an aggregated link. STP may be utilized with MBB to limit an impact on traffic. Revert may include auto revert and manual revert. Revert may be utilized with MBB to limit an impact on traffic.

In another exemplary embodiment, Generalized Multi-Protocol Label Switching ("GMPLS") may provide two priority categories for taking and reserving resources, such as a setup priority and a holding priority. Setup priority may be the priority for taking resources, and holding priority may be the priority for holding resources. For example, holding priority may be the priority at which the resources assigned to the SNC are reserved. A setup request may have an equal or higher priority than the holding priority to preempt an existing assigned reserved resource, such as reserved bandwidth. The setup priority may not be higher than the holding priority in order to prevent an SNC from maybe being preempted after the SNC has been set up.

In another exemplary embodiment, both the setup priority category and the holding priority category may have eight priority levels. These priority levels may be defined by the user as a matter of policy. The request home path feature may utilize the eight priority levels to advertise available reserved bandwidth and normal bandwidth on a link. In this way, originating node 12a may be able to determine if a desired home path is available. Although this exemplary embodiment discloses eight priority levels, the invention is not limited to categories with eight priority levels. Any number of priority levels may be used with the invention.

In an exemplary embodiment, a set of new routing rules may be used. The originating node 12a may determine that a SNC home path is available through the use of available reserve bandwidth on each link on the path. The originating node 12a may initiate a revert action. If there is no contention for the available bandwidth, the SNC returns to the reserved home path. However, if two or more SNCs have reserved home paths on a link, but the link is partially repaired, i.e. the link is not advertising enough available bandwidth for all reverting SNCs, normal bandwidth contention methods may apply. When the full link bandwidth is restored, all SNCs with retained home paths on the link may be able to return to their reserved home path. Reserved resources on a link may be shared between all SNCs with a reserved home path. A SNC reverting to the home path may be dynamically assigned to resources in a most efficient configuration. This may include assigning smaller bandwidth SNCs to the same lines to prevent fragmentation of higher bandwidth lines, which may help ensure large SNCs can be routed in the network.

By utilizing the bandwidth advertisement to determine the state of the link, the need for link state notifications specific to the retained home paths may not be required. This may alleviate the need for transit network elements to have knowledge of the specific home paths on the links. Additionally, originating node 12a may not need knowledge of individual lines in an aggregated link. Given that a reserve bandwidth advertisement may be based on an aggregated link and not on individual lines, notification messages in the control plane network may be greatly reduced.

The reserved home path bandwidth advertisement may allow an SNC to have knowledge of available link resources, so that the SNC may automatically revert to the home path. Using link advertisement notifications, i.e. using existing advertising messages rather than sending individual notifications for every line and SNC, addresses two issues. First, the originating node 12a does not need to have knowledge of the individual lines within an aggregated link. Second, an intermediate network element may not retain the physical facilities and lines to specific SNC paths. The SNC route may include links and not lines, and an SNC returning to a reserved home path may utilize any line in a link and therefore any physical facilities associated with the link.

Originating node 12a may be notified of the available bandwidth of the link and not the available bandwidth of a specific line. This approach may avoid requiring notifications for each line and/or requiring signaling of the SNC path by each network element and every link. Otherwise, individual lines between network elements may need to be exposed to the control plane network, which may greatly increase the message traffic in the control plane.

For example, a new SNC setup request may require both normal and home path reserved priority bandwidth to set up the new SNC. Both normal and reserved priority bandwidth may be consumed in the creation of a new SNC. In some instances, if either normal or reserve bandwidth is not available on the link, the SNC setup request may be rejected. When a link is designated as a home path for a new SNC setup or an SNC not on the link, both normal and reserved priority bandwidth may be consumed in the creation of the new SNC. Additionally, both normal and reserved priority bandwidth may be consumed when setting up the SNC and/or the SNC's home path on the link.

When a link is designated as a home path for an existing SNC currently on the link, no bandwidth may need to be available and no bandwidth may be consumed when setting up the SNC's home path on the link. For an existing SNC with a reserved home path established on a control plane link, but not currently on the home path, originating node 12a may utilize the home path reserved bandwidth advertisement of the link to verify that the home path is available before sending an SNC setup message.

In another exemplary embodiment, an SNC with a reserved home path on the link may use reserved priority bandwidth to revert or mesh restore to that link, and normal priority bandwidth may not need to be available to revert or mesh restore. Originating node 12a may utilize the home path reserve bandwidth advertisement of the link to verify the home path is available before sending a SNC setup message.

An SNC that does not have a reserved home path on a control panel link may not use home path reserved bandwidth to mesh restore, but may use normal priority bandwidth to mesh restore.

In another exemplary embodiment, an SNC without a reserved home path on a link may use reserved priority bandwidth on a link to mesh restore if the SNC may not be restored on another link. An SNC may be unable to mesh restore when a protection path that meets routing constrains may not be found. Routing constraints may include cost or latency constraints. SNCs that are unable to mesh restore may include SNCs that go into back-off. The reserved resources associated with a retained home path may prevent another SNC from restoring to a link. Nevertheless, an SNC that cannot find an alternate restoration path may be allowed to setup using reserved bandwidth, as the SNC may not be able to be restored on any other path, which may impact traffic. An SNC that is restored in this manner may be in a temporary state and may be removed from the link when another path becomes available, thus restoring the home path(s) of the other SNC(s)

To find a restoration path, an SNC may increase the setup priority of a setup request. As a result of increasing the setup priority, a holding priority designated in the setup request may also be increased. The SNC may have a maximum restoration priority that may be assigned by a user. A notification or alarm may be activated when an SNC is at a higher priority, i.e., when preemption occurs. A user may have to take action to move the SNC off the protected path to free bandwidth for other SNCs to revert to their home path.

Figure 7:
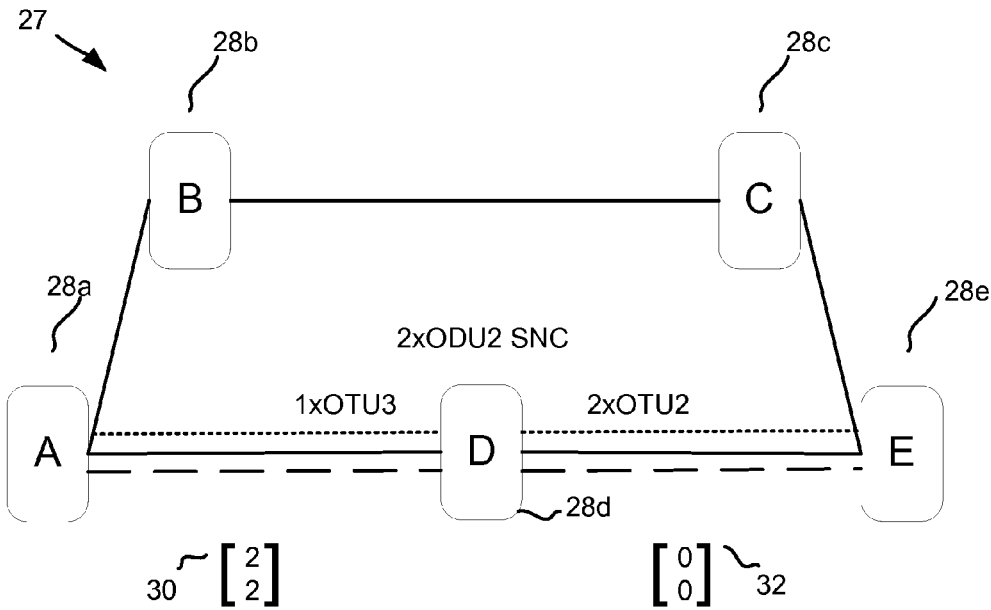
FIG. 7 is a block diagram of an exemplary network with multiple paths, constructed in accordance with principles of the present invention.

FIG. 7 is a block diagram of an exemplary network with multiple paths, constructed in accordance with principles of the present invention and generally designated as "27." Network 27 may be an optical transport network ("OTN") that includes multiple paths between an originating node 28a and a terminating node 28e. OTN 27 may be designed for high data transmission rates such as 2.7 Gb/s for optical transport unit ("OTU") 1, 10.7 Gb/s for OTU2 and 43 G/s for OTU3. The OTN 28 may have an OTU3 line (1×OTU3) which supports four ODU2 (4×ODU2) from node 28a to node 28d, and two OTU2 lines (2×OTU2) from node 28d to node 28e. Two optical channel data units ("ODU") "2" SNCs may run from node 28a to node 28e via intermediate node 28d. The OTU3 line may have two reserved priority bandwidths and two normal priority bandwidths available, i.e. bandwidth availability 30 is [2,2], where the first number indicates reserve priority bandwidth available and the second number indicates normal priority available. The OTU2 lines may have no reserved priority bandwidth or normal priority bandwidth available, i.e. bandwidth availability 32 is [0,0], where the first number indicates reserve priority bandwidth available and the second number indicates normal priority available. Although FIG. 7 shows bandwidth availability 30 and 32 in vertical matrix form, bandwidth availability 30 and 32 is shown horizontally herein for ease of reading.

In an exemplary embodiment, node 28a may determine that reserved priority bandwidth and normal priority bandwidth are available on a link between node 28a and 28d. Node 28a may also determine unavailability of either reserved priority bandwidth or normal priority bandwidth on a link between node 28d and 28e. Bandwidth may be advertised at each supported priority level for each rate. A request home path command may require two priority levels. Normal priority bandwidth may have a priority of "4." The bandwidth advertisement may be treated as legacy bandwidth advertisement. Normal priority bandwidth may indicate bandwidth on a link that is available for routing new SNCs on the link. Reserved priority bandwidth may have a priority of "3" and may indicate bandwidth on a link that is available for routing SNCs with a home path already established on the link. A request home path command for a new SNC may require both normal and reserved path bandwidth. A mesh restore command that restores an SNC with a home path on a link may require reserved path bandwidth, i.e. no normal priority bandwidth may be required.

In an exemplary embodiment, bandwidth may be updated at each supported priority level based on a type of setup or release request. With respect to setup requests, an SNC setup request with or without a home path request may require both normal priority bandwidth and reserved priority bandwidth. This operation may decrement both normal priority bandwidth and reserved priority bandwidth availability. For example, a setup request with or without a home path request may have a setup priority "4" and a holding priority "3."

An SNC setup request where the SNC is reverting to a home path may require only reserved priority bandwidth. An SNC setup request where the SNC is reverting to a home path may decrement reserved priority bandwidth availability, but not normal priority bandwidth. For example, a setup request reverting to a home path may have a setup priority "3" and a holding priority "3." A setup request for a home path on an existing SNC path may not require normal priority bandwidth or reserved priority bandwidth. The setup request for a home path on an existing SNC path may not decrement availability of normal priority bandwidth or reserved priority bandwidth.

Regarding release requests, an SNC release request that does not include a home path release request may increment availability of a reserved priority bandwidth. For example, the release request may have a holding priority of "4." An SNC release request that includes a home path release request may increment both normal priority bandwidth and reserved priority bandwidth. For example, the release request may have a holding priority of "3." A home path release request where an SNC is not on the home path may increment normal priority bandwidth. For example, the home path release request may have a holding priority of "4."

Figure 8:
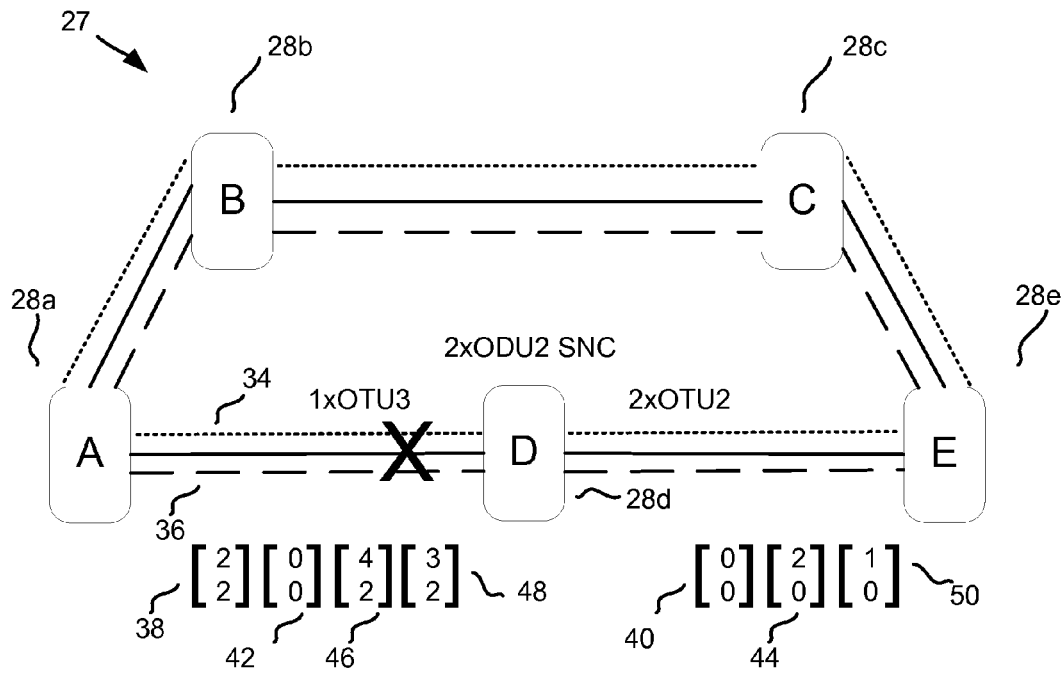
FIG. 8 is a block diagram of the network of FIG. 7 with a failed link between two nodes, constructed in accordance with principles of the present invention.

FIG. 8 is a diagram of the network of FIG. 7, where a failure exists in the path between the originating node 28a and node 28d. In an exemplary embodiment, two ODU2 SNCs, SNC 34 and SNC 36, are on their home path. The home path of SNC 34 and SNC 36 may include originating node 28a, intermediate node 28d and terminating node 28e, i.e. two ODU2 SNCs run from node 28a to node 28e via intermediate node 28d. Node 28a may see a bandwidth availability 38 of [2,2], where the first number indicates reserve priority bandwidth available and the second number indicates normal priority available. Bandwidth availability 38 may indicate that between node 28a and node 28d, two reserved priority bandwidths may be available and two normal priority bandwidths may be available. Node 28a may also see bandwidth availability 40 of [0,0], where the first number indicates reserve priority bandwidth available and the second number indicates normal priority available. Bandwidth availability 40 may indicate that there is no reserved priority bandwidth or normal priority bandwidth availability in the OTU2 line between node 28d and 28e. Although FIG. 8 shows bandwidth availability 30-50 in vertical matrix form, bandwidth availability 38-50 is shown horizontally herein for ease of reading.

The OTU3 line may experience a failure between node 28a and node 28d. Since bandwidth on OTU3 may be unavailable, node 28a may now see a bandwidth availability 42 of [0,0] (where the first number indicates reserve priority bandwidth available and the second number indicates normal priority available) in the OTU3 line between node 28a and node 28d. Node 28a may also see a bandwidth availability 44 of [2,0] (where the first number indicates reserve priority bandwidth available and the second number indicates normal priority available) in the OTU2 line between node 28d and node 28e. Both ODU2 SNCs may mesh restore in response to the failure between node 28a and node 28d. SNCs 34 and 36 may mesh restore to a path originating at node 28a and ending at node 28e via intermediate nodes 28b and 28c. Once the OTU3 line between node 28a and node 28d is repaired, an appropriate bandwidth update may be sent. As OTU3 is repaired, node 28a may see a bandwidth availability 46 of [4,2] indicating that four reserved priority bandwidths and two normal priority bandwidths are available, as OTU3 supports 4×ODU2.

SNC 34 may auto revert or may be reverted manually to its home path, which includes nodes 28a, 28d and 28e. Node 28a may now see a bandwidth availability 48 of [3,2] in the OTU3 line between node 28a and node 28d indicating that three reserved priority bandwidths and two normal priority bandwidths are available. Node 28a may also see a bandwidth availability 50 of [1,0] in the OTU2 line between node 28d and node 28e, indicating that one reserved priority bandwidth is available and no normal priority bandwidth is available. Bandwidth updates may be sent. SNC 36 may also auto revert or may be reverted manually to its home path, which includes nodes 28a, 28d and 28e. Node 28a may see a bandwidth availability 38 of [2,2] (where the first number indicates reserve priority bandwidth available, and the second number indicates normal priority available) in the OTU3 line between node 28a and node 28d, indicating that two reserved priority bandwidths and two normal priority bandwidths are available. Node 28a may also see a bandwidth availability 40 of [0,0] in the OTU2 line between node 28d and node 28e, indicating that neither reserved priority bandwidth, nor normal priority bandwidth is available. Bandwidth updates may be sent.

In another exemplary embodiment, preemption routing rules may be implemented. Node 28a may determine whether a SNC has been restored on a link with a reserved priority level by sending an SNC setup request with a higher than normal setup priority level and holding priority level, such as setup priority level "3" and holding priority level "3." A restoration action for an SNC to be restored on a link with a reserve priority level, but without a home path on the link, may be treated by the adjacent nodes as a preemption action. A preemption action may be performed by adjacent nodes to the link, e.g., nodes 28b and 28c. For the preemption case, where a SNC is restored on a reserved home path, adjacent nodes may not release home paths. An available reserved path bandwidth on the link may be decreased.

Figure 9:
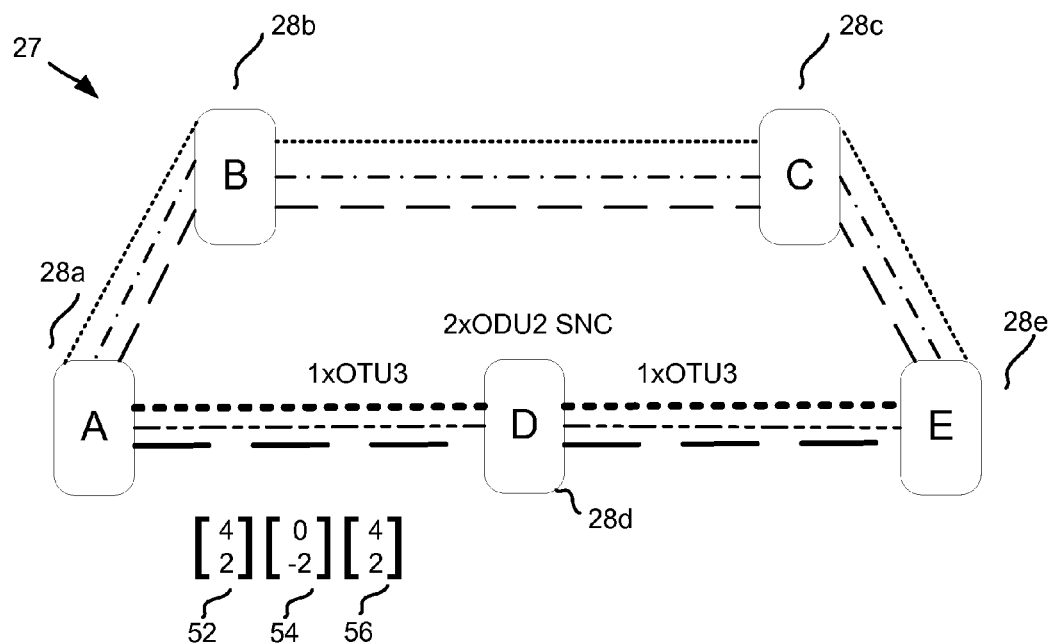
FIG. 9 is a block diagram of the network of FIG. 7 showing two SNCs not being routed on their home paths.

FIG. 9 is a diagram of the network of FIG. 7, where two ODU2 SNCs have home paths including originating node 28a, intermediate node 28d and terminating node 28e. Both SNCs may not be on their home paths. Node 28a may see a bandwidth availability 52 of [4,2], indicating that between node 28a and node 28d, four reserved priority bandwidths may be available and two normal priority bandwidths may be available. Although FIG. 9 shows bandwidth availability 52-56 in vertical matrix form, bandwidth availability 52-56 is shown horizontally herein for ease of reading.

Node 28a may send an ODU3 SNC setup request with reserve priority setup (P3, H3), i.e. with setup priority "3" and holding priority "3" along the path from node 28a to node 28e including node 28d. The ODU3 SNC may be established from node 28a to node 28e and the available reserved bandwidth on the link may be decreased. The ODU3 SNC may not be able to be restored anywhere else. Node 28a may see a bandwidth availability 54 of [0, −2] indicating that no reserved bandwidth is available, and that the normal priority bandwidth is in an oversubscribed state with an excess of two SNCs, i.e. the normal priority bandwidth availability is −2. Zero bandwidth availability may be advertised, but not the −2 bandwidth availability. Alarms may be raised against the ODU3 SNC for preemption of reserved bandwidth, i.e. home path bandwidth on the link. Alarms may also be generated for a link being in an oversubscribed state. Once the ODU3 SNC is removed from the links, the two ODU2 SNC home paths may become available for reversion. Node 28a may see a bandwidth availability 56 of [4,2], indicating that four reserved priority bandwidths are available and two normal priority bandwidths are available.

Figure 10:
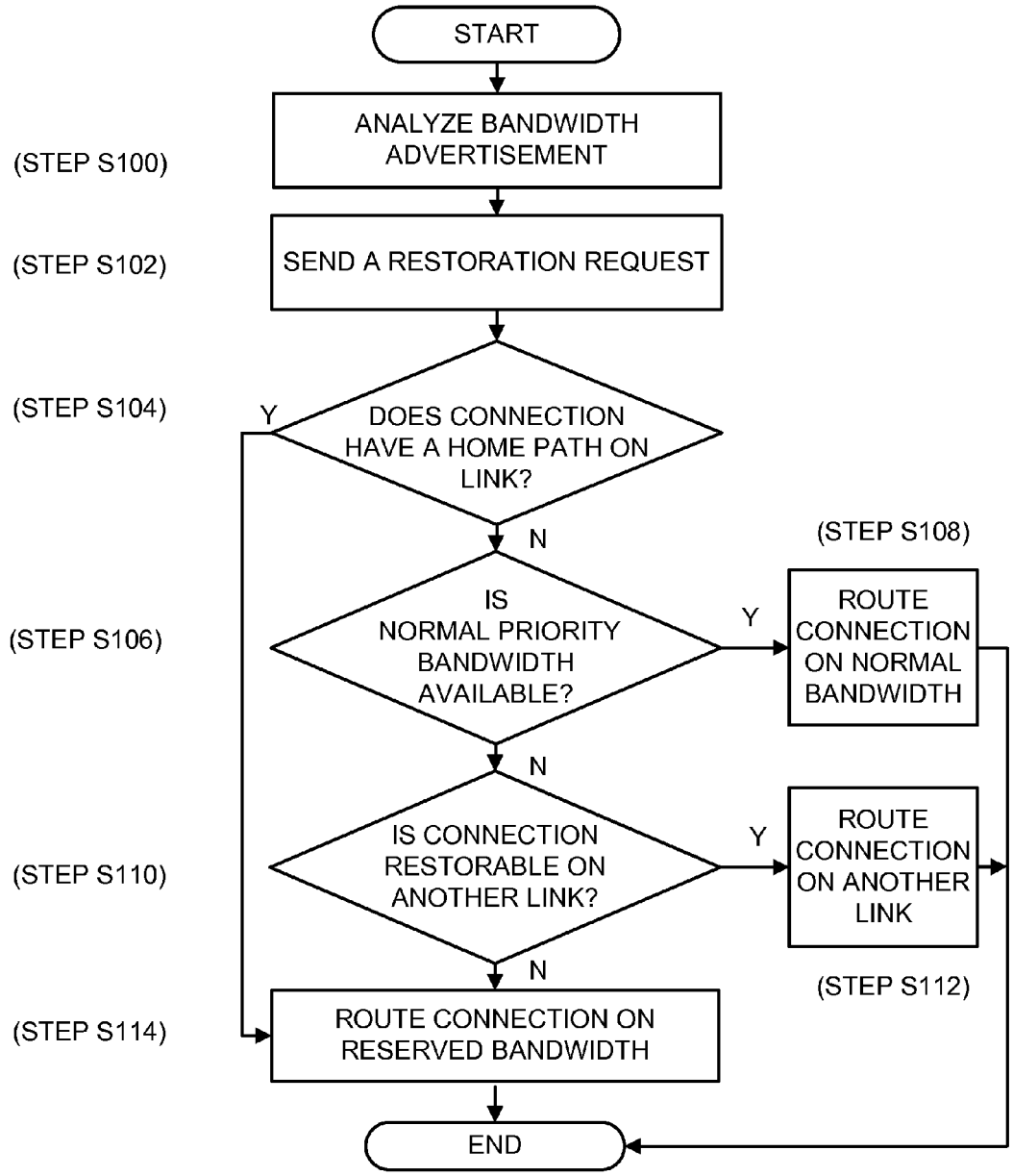
FIG. 10 is a flow chart of an exemplary process for retaining a connection's home path, in accordance with the principles of the present invention.

FIG. 10 is a flow chart of an exemplary process for restoring a connection on a link in accordance with principles of the present invention. The link may include a reserved priority bandwidth. A bandwidth advertisement indicating available reserved bandwidth is analyzed (Step S100). A restoration request is sent (Step S102). A determination is made as to whether the connection has a home path on the link (Step S104). If so, the connection is routed on the reserved bandwidth (Step S114). If the connection does not have a home path on the link, it is determined whether a normal priority bandwidth is available to route the connection (Step S106). If so, the connection is routed on the available normal bandwidth (Step S108). If there is no available normal priority bandwidth, a determination is made as to whether the connection is restorable on another link (Step S110). If so, the connection is routed on another link (Step S112). If the connection is unrestorable on another link, the connection is temporarily routed on the reserved bandwidth (Step S114).

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for restoring a connection from a protection path after a path failure, the method comprising:
    establishing a home path for a connection, the home path having a first normal priority bandwidth assigned to the connection and a first reserved priority bandwidth assigned to the connection;
    routing the connection to a protection path in response to a failure of the home path, the protection path being different than the home path;
    detecting correction of the failure of the home path;
    sending a restoration request requesting to route the connection on the home path in response to the detected correction of the failure of the home path; and
    when the home path has a second connection using the first normal priority bandwidth after the restoration request is sent:
        using the first reserved priority bandwidth to route the connection; and
    when the home path has the second connection using the first normal priority bandwidth and a third connection using the first reserved priority bandwidth after the restoration request is sent:
        determining whether the connection is unrestorable on an alternative normal priority bandwidth of a plurality of alternative home paths; and
        using an alternative reserved priority bandwidth of one of the plurality of alternative home paths to temporarily route the connection.

2. The method of claim 1, further comprising:
    determining whether the connection is on the protection path; and
    reserving the first reserved priority bandwidth for the connection when the connection is on the protection path.

3. The method of claim 1, further comprising:
    analyzing a bandwidth advertisement, the bandwidth advertisement indicating that a reserved bandwidth is available on a link.

4. The method of claim 1, wherein the connection is associated with a connection type and a holding priority, the holding priority being a priority at which resources assigned to the connection are reserved.

5. The method of claim 1, wherein a bandwidth advertisement indicates that a reserved bandwidth is available for at least one home path to be set up on a link.

6. The method of claim 1, further comprising:
    when the connection with the home path is being temporarily routed on the alternative reserved priority bandwidth:
        determining whether another link is available to route the connection with the home path; and
        removing the connection from the the alternative reserved bandwidth when another link is available.

7. The method of claim 1, wherein the restoration request further includes a request to set up a home path on a link.

8. The method of claim 1, further comprising:
    when the connection is being temporarily routed on the second alternative reserved priority bandwidth:
        determining whether a third normal priority bandwidth and a third reserved priority bandwidth are available on a new home path; and
        using the third normal priority bandwidth and the third reserved priority bandwidth to route the connection when the third normal priority bandwidth and the third reserved priority bandwidth are available.

9. An apparatus for restoring a connection on a link, the link including a reserved priority bandwidth, the apparatus comprising:
    a control circuit wherein the control circuit is implemented on a processor, and wherein the processor is coupled to a memory, the control circuit configured to:
    assign a reserved priority bandwidth on a link to a connection;
    analyze a bandwidth advertisement, the bandwidth advertisement indicating that the reserved priority bandwidth is available;
    send a restoration request requesting to route the connection on the link;
    when the link has a second connection on the link:
        use the reserved priority bandwidth to route the connection; and
    when the link has the second connection on the link including the reserved priority bandwidth:
        determine whether a normal priority bandwidth on a second link is available;

determine whether the connection is unrestorable on another link; and use a second reserved priority bandwidth on the second link to temporarily route the connection when the normal priority bandwidth is unavailable and the connection is unrestorable on another link.

10. The apparatus of claim 9, the control circuit further configured to:

determine whether the connection is on a restoration path, the restoration path excluding the link; and reserve the reserved priority bandwidth for the connection when the connection is on the restoration path.

11. The apparatus of claim 9, wherein when the connection has a reserved home path not on the link, the control circuit further configured to:

use a normal priority bandwidth to route the connection when the normal priority bandwidth is available, the normal priority bandwidth having a normal priority bandwidth level that is a same priority level as a connection level associated with the connection.

12. The apparatus of claim 9, wherein the connection is associated with a connection type and a holding priority, the holding priority being a priority at which resources assigned to the connection are reserved.

13. The apparatus of claim 9, wherein the bandwidth advertisement indicates that the reserved bandwidth is available for at least one home path to be set up on the link.

14. The apparatus of claim 9, wherein the restoration request further includes a request to set up a home path on the link, the control circuit further configured to:

determine whether a home path normal priority bandwidth and a home path reserved priority bandwidth are available on the link; and use the home path normal priority bandwidth and the home path reserved priority bandwidth to route the connection when the home path normal priority bandwidth and the home path reserved priority bandwidth are available.

15. The apparatus of claim 9, wherein when the connection has a reserved home path with the reserved home path not on the link and the connection is being temporarily routed on the reserved priority bandwidth, the control circuit further configured to:

determine whether another link is available to route the connection; and remove the connection from the link when another link is available to route the connection.

16. A system, comprising:

an originating network element, the originating network element configured to:

assign a a reserved priority bandwidth on a link to a connection;

analyze a bandwidth advertisement, the bandwidth advertisement indicating that the reserved priority bandwidth on the link is available;

send a restoration request requesting to route the connection on the link;

a terminating network element connected to the originating network element via the link, the terminating network element configured to:

recieve the restoration request;

when the connection has a reserved home path on the link:

use the reserved priority bandwidth to route the connection; and when the connection has a reserved home path not on the link:

determine whether a normal priority bandwidth on the link is available;

determine whether the connection is unrestorable on another link; and use the reserved priority bandwidth to temporarily route the connection when the normal priority bandwidth is unavailable and the connection is unrestorable on another link.

17. The system of claim 16, further comprising:

a plurality of network elements along a connection path between the originating network element and the terminating network element, the connection path including the link; and the terminating network element further configured to send a connect message to the originating network element, the connect message setting up a home path at the plurality of network elements along the connection path.

18. The system of claim 16, wherein the restoration request includes a reserved priority setup.

19. The system of claim 16, the originating network element further configured to:

determine whether the connection with the home path on the link is on a restoration path, the restoration path excluding the link; and reserve the reserved priority bandwidth for the connection with the home path on the link when the connection is on the restoration path.

20. The system of claim 16, wherein when the connection with the reserved home path not on the link is being temporarily routed on the reserved priority bandwidth, the originating network element further configured to:

determine whether another link is available to route the connection with the home path not on the link; and send a release message to release the connection from the link when another link is available to route the connection.

* * * * *